3,322,802
METAL SALTS OF ORGANODITHIOCARBAMATE-ORGANOTHIOCARBAMOYL SULFINATES AND THE PREPARATION THEREOF

Lester A. Brooks and Robert T. O'Shaughnessy, East Norwalk, Conn., assignors to R. T. Vanderbilt Company, Inc., New York, N.Y., a corporation of New York
No Drawing. Filed May 27, 1963, Ser. No. 283,523
23 Claims. (Cl. 260—429)

The present invention relates to novel derivatives of the dialkyldithiocarbamates, and more particularly, to certain oxidized dithiocarbamates derived from divalent, trivalent and tetravalent metals, to methods for their preparation, and to use of these compounds as biocides, agricultural fungicides, antioxidants, and vulcanization accelerators.

The compounds of the present invention have a structure corresponding to the generic formula

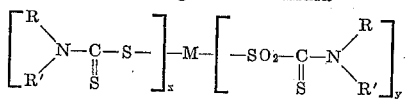

wherein M is a metal selected from the group consisting of the divalent metals copper, zinc, manganese, nickel, lead, cadmium, cobalt tin(II), barium, and mercury, the trivalent metals iron(III) and bismuth, and the tetravalent metal tin (IV), $x$ and $y$ are 1 to 2, their sum being equal to the valence of M, and the moiety

is the residue of any secondary amine which will react with carbon disulfide to form a dithiocarbamate.

R and R' are saturated hydrocarbon groups which can be the same or different, and they can be joined through a methylene group or through an oxygen or sulfur atom to form, with the nitrogen, a heterocyclic ring. The hydrocarbon groups can be alkyl groups having 1 to 12 carbon atoms, cycloalkyl groups and hydrocarbon-substituted cycloalkyl groups having 5 to 12 carbon atoms, or phenylalkyl groups having 7 to 12 carbon atoms. Joined together the groups R and R' may form with the nitrogen heterocyclic rings containing 4 to 5 carbon atoms, 0 to 1 oxygen, and 0 to 1 sulfur atom. The total number of carbon atoms in the groups R and R' (attached to the same nitrogen atom) is suitably 24 or less. Typical radicals in the amine groups include, but are not limited to, methyl, ethyl, propyl, butyl, pentyl, hexyl, octyl, cyclopentyl, cyclohexyl, benzyl and phenethyl. The amine nitrogen can be included in the morpholino, thiamorpholino and piperidino groups.

The compounds of the invention may be illustrated by the following:

Zinc dimethyldithiocarbamate dimethylthiocarbamoylsulfinate;
Zinc di-n-propyldithiocarbamate di-n-propylthiocarbamoylsulfinate;
Barium diethyldithiocarbamate diethylthiocarbamoylsulfinate;
Barium diamyldithiocarbamate diamylthiocarbamoyl sulfinate;
Barium di-(2-ethylhexyl)dithiocarbamate di-(2-ethylhexyl)thiocarbamoylsulfinate;
Barium morpholinodithiocarbamate morpholinothiocarbamoylsulfinate;
Cadmium dimethyldithiocarbamate dimethylthiocarbamoylsulfinate;
Cadmium dihexyldithiocarbamate dihexylthiocarbamoylsulfinate;
Cadmium di(cyclohexyl)dithiocarbamate di(cyclohexyl) thiocarbamoylsulfinate;
Cadmium thiamorpholinodithiocarbamate thiamorpholinothiocarbamoylsulfinate;
Lead dibenzyldithiocarbamate dibenzylthiocarbamoylsulfinate;
Lead diethyldithiocarbamate diethylthiocarbamoylsulfinate;
Lead morpholinodithiocarbamate morpholinothiocarbamoylsulfinate;
Lead piperidinodithiocarbamate piperidinothiocarbamoylsulfinate;
Mercuric dimethyldithiocarbamate dimethylthiocarbamoylsulfinate;
Mercuric diethyldithiocarbamate diethylthiocarbamoylsulfinate;
Mercuric morpholinodithiocarbamate morpholinothiocarbamoylsulfinate;
Cupric diethyldithiocarbamate diethylthiocarbamoylsulfinate;
Cupric piperidinothiocarbamate piperidinothiocarbamoylsulfinate;
Cupric piperidinodithiocarbamate piperidinothiocarbamoylsulfinate;
Stannous dimethyldithiocarbamate dimethylthiocarbamoylsulfinate;
Stannous morpholinodithiocarbamate morpholinothiocarbamoylsulfinate;
Ferric dimethyldithiocarbamate bis(dimethylthiocarbamoylsulfinate);
Ferric morpholinodithiocarbamate bis(morpholinothiocarbamoylsulfinate;
Ferric bis(diethyldithiocarbamate) diethylthiocarbamoylsulfinate;
Ferric bis(piperidinodithiocarbamate) piperidinothiocarbamoylsulfinate;
Bismuth diethyldithiocarbamate bis(diethylthiocarbamoylsulfinate);
Bismuth piperidinodithiocarbamate bis(piperidinothiocarbamoylsulfinate);
Bismuth bis(dimethyldithiocarbamate) dimethylthiocarbamoylsulfinate;
Bismuth bis(morpholinodithiocarbamate) morpholinothiocarbamoylsulfinate;
Stannic bis(dimethyldithiocarbamate) bis(dimethylthiocarbamoylsulfinate;
Stannic bis(morpholinodithiocarbamate) bis(morpholinothiocarbamoylsulfinate).

The novel compounds of the invention are high in biocidal activity and are useful as industrial and agricultural bactericides and fungicides and as antifouling agents in paints. They are also useful as vulcanization accelerators, as antioxidants in polymers and as oxidation and wear inhibitors in lubricants.

It has been discovered very unexpectedly that alkali metal salts of substituted dithiocarbamic acids (hereafter referred to as alkali metal dialkyldithiocarbamates) undergo a very different type of oxidation in alkaline media, producing excellent yields of oxygen-containing products rather than the thiuran disulfides of the prior art process carried out in acidic media. These products, when treated with soluble salts of certain polyvalent metals (the metals M of the general formula given above), yield the novel compounds of the invention.

As a general method for the preparation of the novel compounds of the invention, an alkali metal dialkyldithiocarbamate such as sodium or potassium dialkyldithiocarbamate is dissolved in water, giving a solution which is alkaline in reaction. It is not necessary to add alkali. One mole of hydrogen peroxide is added to produce what is believed to be sodium dialkyldithiopercarbamate according to the reaction

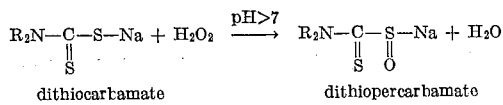

dithiocarbamate    dithiopercarbamate

Treatment of the sodium dialkyldithiopercarbamate with a soluble salt of a divalent metal, M, gives a divalent metal dithiopercarbamate which is found to rearrange immediately to form a new class of compounds, the metal dialkyldithiocarbamate dialkylthiocarbamoylsulfinate (hereafter called the metal dialkylthiocarbamoyl hemisulfinate or simply the metal dialkylhemisulfinate), according to the reaction

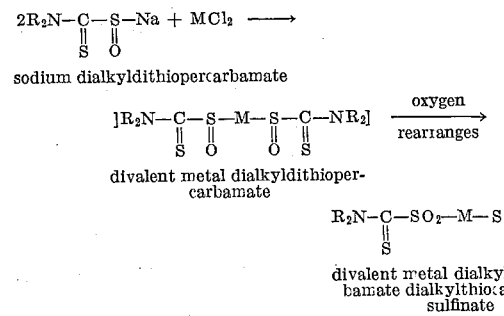

Treatment of the sodium dialkyldithiopercarbamate with a soluble salt of a trivalent metal, M, gives a monosulfinate or a disulfinate, depending upon the proportion of hydrogen peroxide used.

When two moles of hydrogen peroxide are used with three moles of the alkali metal dialkyldithiocarbamate and the resulting mixture is treated with a soluble salt of a trivalent metal, a monosulfinate is formed, e.g.:

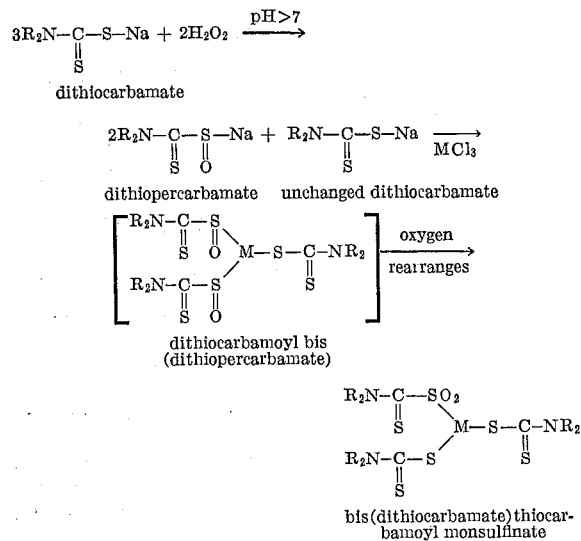

When four moles of hydrogen peroxide are used with three moles of dialkyldithiocarbamate, the disulfinate is formed:

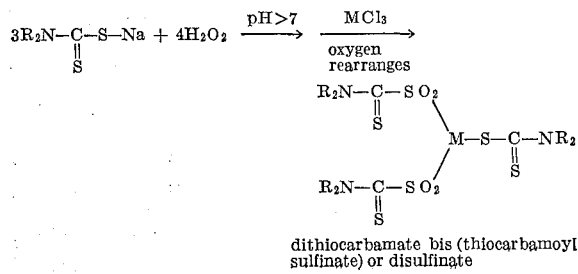

The anion associated with the metal M in the soluble salt used may be any that produces a soluble salt and which does not interfere with the desired reaction. The chloride (or other halide), sulfate (if soluble), nitrate, and also the organic salts (if cost will permit) are suitable.

The oxidation reaction is strongly exothermic and it is desirable to cool the reaction mass to a temperature below about 50° C. Ice can be used as the coolant, and the temperature may be below 0° C., but in general such low temperature is not necessary The preferred temperature range is 5–25° C.

Hydrogen peroxide is the peroxide of choice. It is added slowly with stirring to avoid local overoxidation which would produce contaminating materials. An excess of hydrogen peroxide over the amounts specified is to be avoided for the same reason.

The following examples of polyvalent metal dialkyldithiocarbamate dialkylthiocarbamoylsulfinate preparations are intended to illustrate but not to limit the invention.

*Example I*

Sodium dimethyldithiocarbamate (288 grams, 2.0 moles; 1300 grams of 22.1% solution) was cooled to below 20° C. by internal and external ice cooling. Hydrogen peroxide (68 grams, 2.0 moles; 136 grams of 50% active commercial material) was added dropwise with stirring. After the addition was complete (45 minutes), the solution of sodium dimethyldithiopercarbamate obtained was stirred for an additional hour to insure completion of the reaction. Zinc sulfate monohydrate (180 grams, 1.0 mole) in aqueous solution was added dropwise with stirring. The white precipitate which formed was filtered, washed with water and acetone, then dried in a vacuum oven. The yield of zinc dimethyldithiocarbamate dimethylthiocarbamoyl-sulfinate (zinc dimethyl hemisulfinate) was 310 grams, 92% of theory. Melting point, 229° C. (decomposition).

*Analysis.*—for $C_6H_{12}N_2S_4O_2Zn$: Calc.: C, 21.30; H, 3.58; N, 8.29; S, 38.00; Zn, 19.35. Found: C, 21.67; H, 3.79; N, 7.87; S, 37.94; Zn, 19.9.

*Example II*

Sodium dibutyldithiocarbamate (1244 grams, 4.0 moles; 2550 grams of 48.8% solution) was cooled externally and internally to 10° C. with ice. Hydrogen peroxide (136 grams, 4.0 moles; 272 grams of 50% active material) was added dropwise with stirring and cooling to maintain the temperature below 20° C. A small amount of oil separated out during the addition. After the addition was complete, the mixture was stirred for an additional hour. A solution of zinc sulfate monohydrate (360 grams, 2 moles) in water was added. A gummy white semisolid separated and settled to the bottom of the flask. The water was decanted and the semisolid covered with petroleum ether to take up the oil. The white solid remaining was filtered and dried. Yield of zinc dibutyldithiocarbamate dibutylthiocarbamoyl-sufinate (zinc dibutyl hemisulfinate), was 740 grams, 73% of theory. After recrystallization from ethanol, the hemisulfinate melted at 84–87° C.

*Analysis.*—of $C_{18}H_{36}N_2S_4O_2Zn$: Calc.: C, 42.70; H, 7.17; N, 5.54; S, 25.34; Zn, 12.92. Found: C, 42.50; H, 7.17; N, 5.14; S, 24.85; Zn, 12.9.

*Example III*

Sodium dimethyldithiocarbamate (143 grams, 1 mole; 1430 grams of 10% solution) was cooled to 10° C. by internal and external ice cooling. Hydrogen peroxide (22.7 grams, ⅔ mole; 45.4 grams of 50% active material) was diluted to 20% with water and added dropwise to the dithiocarbamate with stirring and cooling to maintain the temperature below 20° C. After addition of peroxide was complete, the solution was stirred for an additional half hour, then added to a solution of ferric chloride (54 grams, ⅓ mole) in water. The black, gelatinous precipitate which formed was filtered, washed with water and dried. Yield of ferric bis(dimethyldithiocarbamate) dimethylthiocarbamoylsulfinate, hereafter referred to as ferric dimethylmonosulfinate, was 120 grams, 81% of theory. This material decomposed at 245–50° C. without melting.

Bismuth bis(dimethyldithiocarbamate) dimethylthiocarbamoylsulfinate, hereafter referred to as bismuth dimethylmonosulfinate, was prepared in an analogous manner, yield was 95% of theory, melting point 270–272° C. (slight decomposition at 265° C.).

The disulfinates of trivalent metals are prepared as in Example III, using four moles of hydrogen peroxide per mole of dithiocarbamate, as shown below.

*Example IV*

The procedure of Example III was repeated, using sodium dimethyldithiocarbamate (143 grams, 1 mole), hydrogen peroxide (45.4 grams, 1⅓ moles; 90.8 grams of 50% active material), ferric chloride (54 grams, ⅓ mole). Yield of gelatinous black ferric dimethyldithiocarbamate bis(dimethylthiocarbamoylsulfinate), hereafter referred to as ferric dimethyldisulfinate, was 130 grams or 81% of theory. There was slight melting at 175–200° C. with decomposition.

The corresponding bismuth dimethyldithiocarbamate bis(dimethylthiocarbamoylsulfinate), hereafter referred to as bismuth dimethyl disulfinate, was obtained in 95% yield and melted at 180° C. (slight decomposition without melting at 150–155° C.).

*Example V*

The procedure of Example III was repeated, using sodium dimethyldithiocarbamate (72 grams, 0.5 mole; 182 grams of 39.3% solution), hydrogen peroxide (17 grams, 0.5 mole; 34 grams of 50% active material) and stannic chloride pentahydrate (44 grams, 0.125 mole). The yield of yellow stannic bis(dimethyldithiocarbamate) bis(dimethylthiocarbamoylsulfinate) was 95%. Melting point, 255–265° C. (decomposition).

The existence of both the dithiocarbamate group and the thiocarbamoylsulfinate group in the compounds of the invention is shown by their infrared spectra. The infrared spectrum of zinc dimethyldithiocarbamate dimethylthiocarbamoylsulfinate shows absorption in the 9.5–10 micron region ascribed to the $SO_2$ group, and in the 10.2–10.3 micron region ascribed to the dithiocarbamate group. Micro thin layer chromatography in silica gel with benzene as the eluent shows that the material is not a mechanical mixture and that it contains no zinc bis(dimethyldithiocarbamate) as such. That the compounds of the invention do contain a dithiocarbamate group is proved by the following experiment.

*Example VI*

In order to prove the structure of the alkaline oxidation product of dithiocarbamates, zinc dibutyldithiocarbamate dibutylthiocarbamoylsulfinate (the hemisulfinate) (25.3 grams, 0.05 mole) was dissolved in chloroform (250 ml.) filtered into a pressure bottle, treated with methyl iodide (0.125 mole) and heated at 60° C. for 24 hours. The resulting chloroform solution was washed with water to remove zinc iodide, then dried over anhydrous magnesium sulfate and the solvent removed by evaporation. The product was a semisolid which was treated with successive portions of warm petroleum ether, leaving a solid (10 grams) which was identified as unchanged starting material.

The petroleum ether washings were shown by micro thin layer chromatography to contain two main products in equal proportions. These were separated by concentrating the petroleum ether and cooling, whereupon a white solid (3 grams) separated. It was identified as S-methyl dibutyldithiocarbamate by comparing its infrared spectrum and melting point with those of an authentic sample. The remaining petroleum ether was evaporated in vacuo, leaving an amber liquid (3 grams) which was unstable, as might be expected, and from which no definite products could be isolated.

In contrast, zinc dibutyldithiocarbamate treated in the same way with methyl iodide reacts completely and yields as its sole product, S-methyl dibutyldithiocarbamate, formed according to the equation:

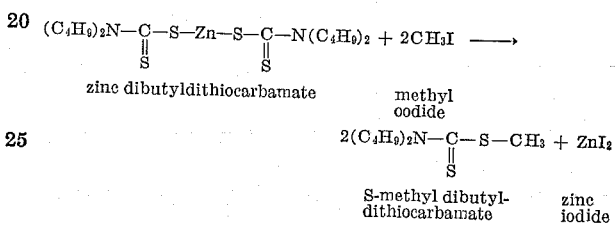

The reaction of the hemisulfinate with methyl iodide to give S-methyl dibutyldithiocarbamate proves that there is at least one dithiocarbamate group present in the molecule. Quantitative analysis of the hemisulfinate shows the presence of two atoms of oxygen which must therefore be present in another portion of the molecule. It is believed that the methyl iodide reacts as shown below to give the expected S-methyl dibutyldithiocarbamate and another oxygenated molecule which might be expected to be unstable:

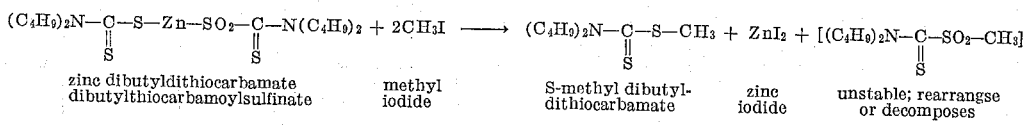

The foregoing tends to prove the accuracy of the general formula given above.

That the dialkylthiocarbamoysulfinates possess high activity against microorganisms is shown in the following examples.

*Example VII*

Screening tests of the thiocarbamoysulfinates against representative microorganisms were performed as follows: Tests against the fungus *Aspergillus niger* were conducted by inoculating the test organisms onto Mycophil agar plates prepared with serial dilutions of the test compounds. The inoculated plates were incubated for 96 hours at 77° F. and the lowest concentration of test compound which completely inhibited fungal growth was recorded in parts per million (p.p.m.). Zone of inhibition tests against three representative bacteria, *Bacillus subtilis*, *Staphylococcus aureus*, and *Salmonella typhosa*, were conducted by placing paper discs dipped in various concentrations of the test compound on agar plates seeded with one of the test organisms, then incubating the plates for 24 hours at 100° F. The lowest concentration of the test chemical producing a clear zone denoting lack of bacterial growth around the disc were recorded in p.p.m. Typical tests of the sulfinates are presented in Table 1.

TABLE 1.—MICROBIOLOGICAL SCREENING OF SULFINATES

| Sulfinate (Color) | Lowest Concentration Inhibiting Growth, p.p.m. | | | |
|---|---|---|---|---|
| | A. niger | B. subtilis | S. aureus | S. typhosa |
| Zinc dimethylhemi-[2] (white) | 100 | 10 | 10 | 5 |
| Zinc diethylhemi- (white) | [1]+M | 20 | 10 | 50 |
| Zinc dibutylhemi- (white) | +M | 500 | +10M | +10M |
| Zinc diamylhemi- (white) | +M | 100 | +10M | 10M |
| Zinc morpholinohemi- (off-white) | +M | 50 | 500 | 50 |
| Zinc piperidinohemi- (off-white) | M | 100 | 100 | 100 |
| Cadmium dimethylhemi- (light yellow) | 100 | 5 | 50 | 100 |
| Cadmium diethylhemi- (light yellow) | 500 | 5 | 10M | 300 |
| Mercuric dimethylhemi- (brown) | 300 | 500 | 5 | 5 |
| Barium dimethylhemi- (white) | 300 | 50 | 50 | 50 |
| Manganous dimethylhemi- (tan) | 100 | 10 | 50 | 20 |
| Cobaltous dimethylhemi- (olive green) | +M | 10M | 10M | 10M |
| Nickel dimethylhemi- (light green) | +M | 20 | 50 | 300 |
| Cupric dimethylhemi- (brown) | 300 | 20 | 20 | 50 |
| Stannous dimethylhemi- (yellow tint) | 500 | 20 | 50 | 20 |
| Lead dimethylhemi- (dark tan) | +M | 50 | 50 | 300 |
| Lead diethylhemi- (light tan) | +M | 10 | 100 | 300 |
| Ferric dimethylmono-[3] (black) | 300 | 20 | 10 | 20 |
| Ferric dimethyldi-[4] (black) | 300 | 20 | 20 | 20 |
| Bismuth dimethylmono- (yellow) | +M | 10 | 100 | 5 |
| Bismuth dimethyldi- (yellow) | +M | 10 | 50 | 5 |
| Stannic dimethyldi- (light yellow) | M | 20 | 20 | 20 |

[1] M=1000; +M=greater than 1000.
[2] Zinc dimethyldithiocarbamate dimethylthiocarbamoylsulfinate (Zinc dimethyl hemisulfinate).
[3] Ferric bis(dimethyldithiocarbamate) dimethylthiocarbamoylsulfinate (Ferric dimethylmonosulfinate).
[4] Ferric dimethyldithiocarbamate bis(dimethylthiocarbamoylsulfinate) (Ferric dimethyldisulfinate).

*Example VIII*

The microbiological activity of the dialkyldithiocarbamate dialkylthiocarbamoylsulfinates in soap was tested by blending 1% of one of the test compounds into separate portions of Ivory soap (a neutral, while, high grade toilet soap consisting of a mixture of 80% sodium soap and 20% potassium soap produced from a blend of 70% tallow and 30% coconut oil in accordance with U.S. Patent No. 2,245,594). The soap was compressed into plugs which were placed in separate plates containing hardened nutrient agar and inoculated with the test bacteria of Example VII. The plates were incubated for 24 hours at 37° C., then the diameter of the zone of no bacterial growth around each soap plug was measured in millimeters. In a second test, substantivity to skin or hide (as a measure of retention on the skin) was determined by soaking untanned calf skin buttons in an 8% solution of the test soap (above) in water, i.e., in an 0.008% concentration of the hemisulfinate in aqeuous soap solution, then rinsing the buttons three times in an equal volume of distilled water. The buttons were then placed on seeded nutrient agar plates and incubated for 24 hours at 37° C. as above, and the zone of inhibition recorded in millimeters. The results of these tests are shown in Table 2.

TABLE 2.—BACTERIOSTATIC SOAP TESTS

| Sulfinate | Zone of Inhibition in Millimeters | | | | | |
|---|---|---|---|---|---|---|
| | Soap Plugs | | | Hide Substantivity | | |
| | B. subtilis | S. aureus | S. typhosa | B. subtilis | S. aureus | S. typhosa |
| Zinc dimethylhemi-[2] | 52 | 37 | 27 | 13 | 12 | 11 |
| Zinc diethylhemi- | 25 | 24 | 25 | 5 | 5 | 3 |
| Zinc dibutylhemi- | 10 | 0 | 4 | 0 | 0 | 0 |
| Zinc diamylhemi- | 8 | 6 | 9 | 0 | 0 | 0 |
| Zinc morpholinohemi- | 20 | 19 | 22 | [1] Tr | 6 | 7 |
| Zinc piperidinohemi- | 17 | 17 | 19 | 2 | 8 | 3 |
| Cadmium dimethylhemi- | 18 | 12 | 9 | 7 | 6 | 5 |
| Cadmium diethylhemi- | 22 | 9 | 8 | 3 | 2 | 0 |
| Mercuric diemthylhemi- | 18 | 17 | 11 | 4 | 6 | 2 |
| Barium dimethylhemi- | 25 | 26 | 21 | 3 | 6 | 4 |
| Manganese dimethylhemi- | 32 | 27 | 27 | 5 | 6 | 7 |
| Cobaltous dimethylhemi- | 18 | 15 | 16 | 2 | 4 | 0 |
| Nickel dimethylhemi- | 25 | 22 | 22 | 3 | 4 | [1] Tr |
| Cupric dimethylhemi- | 19 | 14 | 15 | 2 | [1] Tr | 0 |
| Stannous dimethylhemi- | 33 | 26 | 27 | 10 | 15 | 8 |
| Lead dimethylhemi- | 22 | 12 | 20 | 2 | 4 | 2 |
| Lead diethylhemi- | 19 | 20 | 20 | 0 | 4 | [1] Tr |
| Ferric dimethylmono-[3] | 40 | 44 | 32 | 20 | 20 | 14 |
| Ferric dimethyldi-[4] | 36 | 34 | 30 | 21 | 20 | 22 |
| Bismuth dimethylmono- | 13 | 12 | 10 | 8 | 2 | 4 |
| Bismuth dimethyldi- | 16 | 22 | 22 | 6 | 4 | 8 |
| Stannic dimethyldi- | 20 | 30 | 17 | 10 | 17 | 12 |

[1] Tr=Trace.
[2,3,4] For explanation of full names see footnote to Table 1.

*Example IX*

Zinc dimethyldithiocarbamate dimethylthiocarbamoylsulfinate was blended into separate portions of Ivory soap at concentrations of 1%, 0.75%, 0.5% and 0.25% according to Example VIII and tested according to that example. Table 3 shows that soap containing as little as 0.25% by weight of the hemisulfinate is highly bacteriostatic, and that 8% solutions of soap containing this low concentration of the test material (0.002% hemisulfinate in the soap solution) confer bacteriostatic properties to the skin which last through rinsing and drying.

TABLE 3.—ZINC DIMETHYLDITHIOCARBAMATE DIMETHYLTHIOCARBAMOYLSULFINATE AT VARYING CONCENTRATIONS IN SOAP

| Concentration In Soap | Zone of Inhibition in Millimeters | | | | | |
|---|---|---|---|---|---|---|
| | Soap Plugs | | | High Substantivity | | |
| | B. subtilis | S. aureus | S. typhosa | B. subtilis | S. aureus | S. typhosa |
| 1.0 | 33 | 31 | 26 | 13 | 10 | 5 |
| 0.75 | 32 | 31 | 28 | 6 | 8 | 2 |
| 0.50 | 29 | 30 | 21 | 8 | 7 | 4 |
| 0.25 | 28 | 30 | 24 | 2 | 4 | 0 |

In the foregoing tests the hemisulfinates have been used in soap, but other detergents may be substituted for the soap.

*Example X*

A soil burial test was performed by treating 6" by 10" pieces of 10-ounce cotton duck with a 1% dispersion of zinc dimethyldithiocarbamate dimethylthiocarbamoyl sulfinite in water containing a surfactant. The treated fabric was passed through a wringer in such a manner that test solution equal to the weight of the fabric was retained thereon, that is, 1% by weight of the test compound was deposited on the fabric. A sample one inch square was removed from the treated fabric and placed on Mycophil agar and both agar and the 1-inch sample were inoculated with a spore suspension mixture containing *Aspergillus niger, Penicillium citrinum, P. luteum,* and *Trichoderma T–1.* The assembly was incubated for 14 days at 77° F. and observed for growth of the test fungi. The remainder of the fabric sample was buried in microbiologically active soil kept at 77° F. After 14 days' burial, the fabric was removed, washed, and dried. Tensile test strips were cut with the length in the warp direction and ravelled to exactly one inch in width. Tensile strength was determined according to Federal Test Method CCC–T–191b Method 5104, and that of buried fabric was compared with that of unburied fabric. A retention of 80% of tensile strength in general denotes satisfactory mildew-proofing. The results of these tests are presented in Table 4.

TABLE 4.—MILDEW-PROOFING WITH ZINC DIMETHYLDITHIOCARBAMATE DIMETHYLTHIOCARBAMOYL SULFINATE

| Sample | Concn. of Hemisulfinate, Percent | Growth Agar Plate [1] | Tensile Retention After Soil Burial, Percent |
|---|---|---|---|
| Control | 0 | +++ | 0 |
| Treated | 1 | 0 | 95 |

[1] Key: 0=no mold growth; +=slight mold growth; ++=moderate mold growth; +++=growth completely covers specimen.

*Example XI*

Zinc dimethyldithiocarbamate dimethylthiocarbamoyl sulfinate was incorporated at 2% concentration in fabric softener laundry product prepared by diluting a commercial antistatic product (Protecter & Gamble's "Downy," a di-N-alkyl dimethylammonium chloride dissolved in isopropanol and water) 1:400. Discs of diaper fabric 1 7/16 inches in diameter were prepared, soaked in tap water, run through a wringer, placed in 400 ml. of the softener solution, agitated for 3 minutes, wrung again, and air dried. The dried fabric samples were placed in 4-ounce jars and each assembly was steam sterilized. The sterile samples were padded with 1 ml. of an 18-hour broth culture of *Staphylococcus aureus* which had been diluted with sterile nutrient broth to a cell count of 200,000. Each assembly was incubated at 98° F. for 18 hours and cells remaining on the treated fabric were counted, using the serial plate dilution technique. Percent reduction of cell count was calculated from the ratio of cell count after incubation to that of the original inoculum. Results of the test, tabulated below, show that fabric treated with the test material in fabric softener medium is rendered highly bacteriostatic. Other fabric conditioning products may be substituted for the quaternary ammonium compound.

TABLE 5.—BACTERIOSTATIC FABRIC

| Test | Bacteria Count Number | Reduction in Bacteria, Percent |
|---|---|---|
| Original Inoculum | 200,000 | |
| Fabric treated with softener only | 260,000,000 | 0 |
| Fabric treated with zinc dimethyl hemisulfinate | <100 | >99.99 |

The compounds of the invention are also useful as rubber and plastics additives. They act as accelerators of vulcanization for many rubbers, and they possess antioxidant or stabilizing properties in resins, as demonstrated in the following examples.

*Examples XII to XVIII*

Tests of the sulfinates of the invention as accelerators in various rubbers were performed in base stocks typical of those rubbers. The formulations used, the proportion of accelerator, the curing conditions, and the tests performed are summarized in the table below. Mooney scorch tests were performed at 250° F. on uncured stocks and the time in minutes necessary to reach a 5-point rise was recorded along with the plasticity values obtained. After cure under the conditions indicated for each rubber, the following physicals were determined: stress (S) or modulus of elasticity at 300% elongation expressed in pounds per square inch; tensile strength (T) in pounds per inch at the moment of rupture; percent of elongation at rupture (E) or ultimate elongation; and hardness (H) on the Shore A scale.

*Example XII*

Zinc dimethylthiocarbamoyl hemisulfinate was added to separate portions of the following natural rubber formulation:

| | Parts by weight |
|---|---|
| Natural rubber | 100 |
| Stearic acid | 2 |
| Zinc oxide | 5 |
| FT carbon black | 75 |
| Sulfur | 2.5 |

Hemisulfinate accelerator as indicated.

in a concentration of 0.4 per one hundred parts of rubber (phr.). Similar formulations were made using the zinc diethyl and the dibutyl hemisulfinates instead of the zinc dimethyl hemisulfinate as accelerator. The test formulations were press cured for 30 minutes at 290° F. The physical properties of stock are given in the table below, together with Mooney scorch values determined on corresponding uncured stocks as measures of the state of cure attained at 250° F., and their plasticity. The data presented in the table show that zinc dimethyl, diethyl and dibutylthiocarbamoyl hemisulfinates are accelerators for natural rubber.

TABLE 6.—CURE OF NATURAL RUBBER ZINC DIALKYLTHIOCARBAMOYL HEMISULFINATE

|  | Dimethyl, 0.4 phr. | | | | Diethyl, 0.4 phr. | | | | Dibutyl, 0.4 phr. | | | |
|---|---|---|---|---|---|---|---|---|---|---|---|---|
| Mooney Scorch at 250° F.: Scorch time, minutes Plasticity | 4 38.5 | | | | 6 35.5 | | | | 7 37.5 | | | |
|  | S | T | E | H | S | T | E | H | S | T | E | H |
| Physicals of Stocks Press Cured for 30 minutes at 290° F | 630 | 2,300 | 550 | 53 | 610 | 2,600 | 610 | 52 | 580 | 2,420 | 590 | 52 |

*Example XIII*

The zinc dialkylthiocarbamoyl hemisulfinates of Example XII were incorporated at concentrations of 0.6 phr. on the following styrene butadiene rubber compound:

| | Parts by weight |
|---|---|
| SBR 1500 (styrene-butadiene copolymer) | 100 |
| Stearic acid | 2 |
| Zinc oxide | 5 |
| Reogen [1] | 5 |
| HAF carbon black | 35 |
| MT carbon black | 25 |
| Sulfur | 2 |
| Hemisulfinate accelerator | 0.6 |

[1] Mixture of oil-soluble sulfonic acid of high molecular weight with a paraffin oil, a plasticizer of R. T. Vanderbilt Company, Inc.

These formulations were press cured at 307° F. for 30 minutes. Physical properties were determined on test pieces. Table 7 compares Mooney scorch and plasticity and physicals of these stocks.

*Example XIV*

Copper dimethylthiocarbamoyl hemisulfinate was tested as a secondary accelerator in a heavily loaded styrene-butadiene rubber stock in which benzothiazyl disulfide was the primary accelerator. The effect of added antioxidant was also tested for each of the secondary accelerators. The following styrene-butadiene rubber formulation was used:

| | Parts by weight |
|---|---|
| SBR Type 1503 (styrene-butadiene copolymer) | 100 |
| Stearic acid | 2 |
| Zinc oxide | 5 |
| Hard clay | 100 |
| Sulfur | 2 |
| Benzothiazyl disulfide | 1.5 |
| Hemisulfinate secondary accelerator, as indicated. | |
| Antioxidant, Agerite Stalite,[1] as indicated. | |

[1] Octylated diphenylamine antioxidant, commercial antioxidant of R. T. Vanderbilt Company, Inc.

TABLE 7.—CURE OF STYRENE-BUTADIENE RUBBER ZINC DIALKYLTHIOCARBAMOYL HEMISULFINATE

|  | Dimethyl, 0.4 phr. | | | | Diethyl, 0.4 phr. | | | | Dibutyl, 0.4 phr. | | | |
|---|---|---|---|---|---|---|---|---|---|---|---|---|
| Mooney Scorch at 250° F.: Scorch time, minutes Plasticity | 27 39.5 | | | | 40 37 | | | | 61 38 | | | |
|  | S | T | E | H | S | T | E | H | S | T | E | H |
| Physicals of Stocks Press Cured for 30 minutes at 307° F | 1,620 | 2,020 | 350 | 61 | 1,480 | 1,980 | 369 | 60 | 1,070 | 2,190 | 510 | 56 |

The data show that the dimethylthiocarbamoyl hemisulfinate at 0.6 phr. produces satisfactory rate and state of cure.

The compositions of the treated stocks, the Mooney scorch values and the physical properties are presented in Table 8.

TABLE 8.—COPPER DIMETHYLTHIOCARBAMOYL HEMISULFINATE IN SBR

| Hemisulfinate | Without Antioxidant | | | | | | | | With Antioxidant [1] | | | |
|---|---|---|---|---|---|---|---|---|---|---|---|---|
|  | 0.25 phr. | | | | 0.4 phr. | | | | 0.25 phr. | | | |
| Mooney Scorch at 250° F.: Total time, minutes Plasticity | 34 42 | | | | 31 43.5 | | | | 29 41 | | | |
|  | S | T | E | H | S | T | E | H | S | T | E | H |
| Physicals of Stocks Cured for 25 minutes at 307° F | 690 | 1,900 | 640 | 67 | 750 | 1,990 | 600 | 69 | 650 | 2,110 | 680 | 66 |

[1] Octylated diphenylamine antioxidant at 2 phr. concentration.

The data show that the hemisulfinate is satisfactory as a secondary accelerator.

The test formulations were cured in open steam at 388° F. for 20 seconds. The table below compares physical properties and Mooney values.

TABLE 9.—BISMUTH THIOCARBAMOYL SULFINATES IN SBR WIRE FORMULATIONS

|  | Bismuth Dimethylthiocarbamoyl monosulfinate | | | | | | Bismuth Dimethylthiocarbamoyl disulfinate | | | | | |
|---|---|---|---|---|---|---|---|---|---|---|---|---|
|  | 2 phr. | | | 2.4 phr. | | | 2 phr. | | | 2.8 phr. | | |
| Mooney Scorch at 250° F.: Total time, minutes  Plasticity | 9 41 | | | 8 43 | | | 5 43 | | | 4 44 | | |
|  | S | T | E | S | T | E | S | T | E | S | T | E |
| Physicals of Stocks Cured for 20 seconds in Open Steam at 388° F | 220 | 700 | 710 | 200 | 640 | 700 | 180 | 680 | 710 | 200 | 760 | 730 |

*Example XV*

Bismuth dimethylthiocarbamoyl monosulfinate in concentrations of 2 and 2.4 phr. was compared with bismuth dimethylthiocarbamoyl disulfinate at 2 and 2.8 phr. in separate portions of the following SBR RH-RW (heat-resistant, water-resistant) wire formulation:

| | Parts by weight |
|---|---|
| SBR type 1503 (styrene-butadiene copolymer) | 75 |
| SBR type 1018 (styrene-butadiene copolymer) | 25 |
| Stearic acid | 1 |
| Zinc oxide | 25 |
| Mineral rubber | 30 |
| Ceresin wax | 2 |
| Microcrystalline wax | 2 |
| Whiting | 75 |
| Clay, electrical grade | 75 |
| Litharge | 3 |
| Benzothiazyl disulfide | 2 |
| Agerite Resin D [1] | 1 |
| Agerite White [2] | 2 |
| Hemisulfinate accelerator, as indicated. | |

[1] Polymerized 2,2,4-trimethyl-1,2-dihydroquinoline commercial antioxidant of the R. T. Vanderbilt Company, Inc.
[2] Symmetrical di-beta-naphthyl-p-phenylenediamine commercial antioxidant of the R. T. Vanderbilt Company, Inc.

Both types of sulfinates are seen to possess good accelerating properties, developing a good rate and state of cure.

*Example XVI*

Zinc dimethylthiocarbamoyl hemisulfinate was tested as an accelerator in a typical neoprene stock:

| | Parts by weight |
|---|---|
| Neoprene type W (polychloroprene) | 100 |
| Stearic acid | 0.5 |
| Zinc oxide | 5 |
| Octlyated diphenylamine antioxidant | 2 |
| Plastogen [1] | 5 |
| Magnesium oxide | 4 |
| MT carbon black | 75 |
| Hemisulfinate accelerator, as indicated. | |

[1] Mixture of oil-soluble sulfonic acid of high molecular weight with a paraffin oil, a plasticizer of R. T. Vanderbilt Company, Inc.

One portion of the base stock was accelerated by 0.7 phr. of zinc dimethylthiocarbamoyl hemisulfinate, and one portion was left unaccelerated (untreated control). The test formulations were press cured at 307° F. for 45 minutes. Mooney scorch tests and physical properties were determined. The results are tabulated below.

TABLE 10.—CURE OF NEOPRENE

| | Hemisulfinate 0.7 phr. | | | | Untreated Control None | | | |
|---|---|---|---|---|---|---|---|---|
| Mooney Scorch at 250° F.: Total time, minutes  Plasticity | 16 32 | | | | 60 31 | | | |
| | S | T | E | H | S | T | E | H |
| Physicals of Stocks Cured for 45 minutes at 307° F | 410 | 2,030 | 550 | 50 | 110 | 770 | 770 | 43 |

The data show that zinc dimethylthiocarbamoyl hemisulfinate shows accelerator activity in neoprene.

*Example XVII*

The zinc dialkylthiocarbamoyl hemisulfinates of Example XII were tested as accelerators in a typical butyl rubber formulation:

| | Parts by weight |
|---|---|
| Butyl rubber 325 (isobutylene-isoprene copolymer) | 100 |
| Stearic acid | 0.5 |
| Zinc oxide | 5 |
| HAF carbon black | 40 |
| Process oil [1] | 5 |
| Sulfur | 1.5 |
| Hemisulfinate accelerator | 1 |

[1] Faxam 40 of Humble Oil and Refining Co.

The compositions were press cured at 320° F. for 60 minutes. Physical properties were measured as well as Mooney scorch data obtained at 250° F. The data are tabulated below. The data show that the sulfinates are active accelerators in butyl rubber, the ethyl and butyl derivatives being less active than the methyl. They also have acceptable scorch values.

The test compositions were press cured for 16 minutes at 345° F. Mooney scorch was determined at 250° F. Physical properties of the cured specimens were determined, including stress at both 100% and 300% elongation.

TABLE 12.—CURE OF ELASTOMERIC ETHYLENE-PROPYLENE TERPOLYMER ZINC DIALKYLTHIOCARBAMOYL HEMISULFINATE

| | Dimethyl, 1.5 phr. | | | | | Diethyl, 1.5 phr. | | | | | Dibutyl, 1.5 phr. | | | | |
|---|---|---|---|---|---|---|---|---|---|---|---|---|---|---|---|
| Mooney Scorch at 250° F.: Total time, minutes Plasticity | 26 79 | | | | | 41 76 | | | | | 38 77 | | | | |
| | $S^1$ | $S^2$ | T | E | H | $S^1$ | $S^2$ | T | E | H | $S^1$ | $S^2$ | T | E | H |
| Physicals after Press Cure for 16 minutes at 345° F | 220 | 1,230 | 1,440 | 400 | 62 | 180 | 1,080 | 1,440 | 430 | 6 | 180 | 930 | 1,370 | 510 | 58 |

[1] Stress at 100% elongation. [2] Stress at 300% elongation.

The thiocarbamoyl hemisulfinates show activity as accelerators in the terpolymer. There is no undue degree of scorch.

The antioxidant effect of the dithiocarbamate thiocarbamoylsulfinates in polyolefin and olefin copolymer resins has been tested by several different techniques.

*Example XIX*

To separate portions of DYNH low-density polyethylene (having approximate molecular weight of 21,000; specific gravity 0.92; melt index at 190° C. is 3.9 grams/

TABLE 11.—CURE OF BUTYL RUBBER ZINC DIALKYLTHIOCARBAMOYL HEMISULFINATE

| | Dimethyl, 1 phr. | | | | Diethyl, 1 phr. | | | | Dibutyl, 1 phr. | | | |
|---|---|---|---|---|---|---|---|---|---|---|---|---|
| Mooney Scorch at 250° F.: Total time, minutes Plasticity | 22 37 | | | | 27 34 | | | | 32 33 | | | |
| | S | T | E | H | S | T | E | H | S | T | E | H |
| Physicals of stocks Cured for 60 minutes at 320° F | 890 | 2,370 | 560 | 53 | 730 | 2,330 | 600 | 52 | 680 | 2,340 | 640 | 49 |

*Example XVIII*

The sulfinate accelerators of Example XII were added to separate portions of a sulfur-curable elastomeric ethylene-propylene terpolymer, Royalene 200 of Naugatuck Chemical Company. The base formulation contained:

| | Parts by weight |
|---|---|
| Royalene 200 [1] | 100 |
| Stearic acid | 1.5 |
| Zinc oxide | 5 |
| MT carbon black | 100 |
| HAF carbon black | 20 |
| Plastogen | 15 |
| Sulfur | 1.5 |
| Hemisulfinate accelerator | 1.5 |

[1] Royalene 200 of Naugatuck Chemical Co. may be described as a sulfur-curable elastomeric ethylene-propylene terpolymer containing a small controlled amount of a diene; Mooney ML 4 at 212° F. is 140; specific gravity 0.865; iodine number 10. It also contains 0.5% of a non-staining stabilizer.

10 minutes; and power factor is 0.0004 at 60° C. and 60 cycles, 0.0007 at 90° C.) were added 0.5 and 0.1 phr. of the zinc dimethyl, zinc diethyl and zinc dibutyldithiocarbamate thiocarbamoylsulfinates. The test resins were fluxed at 220° F. until they banded on the mill, or about 4 minutes. After sheeting off the mill, they were pressed for 5 minutes at 260° F. and 3500 p.s.i. pressure. Tensile strength and elongation were determined according to ASTM D412–51T on samples before aging and after aging for 4 hours in a 400° F. oven. Control samples containing no stabilizer were prepared and tested in the same way. The results of these tests are summarized in the table below:

forefinger. Time to failure was recorded as the day on which brittleness was first observed. This test is of sig-

TABLE 13.—HEMISULFINATES IN POLYETHYLENE

| Hemisulfinate | Concentration, phr. | Original | | Oven-Aged at 400° F. for 4 hrs. | |
|---|---|---|---|---|---|
| | | Tensile, p.s.i. | Elong., percent | Tensile, p.s.i. | Elong., percent |
| None | | 1,570 | 630 | 1,520 | 250 |
| Zinc dimethyl | 0.1 | 1,400 | 630 | 1,400 | 80 |
| | 0.5 | 1,500 | 630 | 1,440 | 560 |
| Zinc diethyl | 0.1 | 1,420 | 640 | 1,400 | 80 |
| | 0.5 | 1,760 | 650 | 1,200 | 600 |
| Zinc dibutyl | 0.1 | 1,740 | 630 | 1,200 | 90 |
| | 0.5 | 1,580 | 640 | 1,400 | 560 |

The elongation values shown in this table indicate that 0.5 phr. of the zinc dialkylthiocarbamoyl hemisulfinates tested stabilize the resin since there is excellent retention of elongation in this very strenuous test.

nificance when there are large differences in time to failure.

The results of these tests are tabulated below.

TABLE 14.—HEMISULFINATES IN POLYPROPYLENE

| Hemisulfinate | Concentration, phr. | Form Stability | | Aluminum block Heat Stability, days to fail |
|---|---|---|---|---|
| | | 60 minutes, percent flow | 120 minutes, percent flow | |
| None | | 51.0 | 65.0 | 1 |
| Zinc dimethyl | 0.1 | 6.4 | 12.5 | 1 |
| | 0.5 | 4.4 | 12.5 | 14 |
| Zinc diethyl | 0.1 | 9.0 | 13.6 | 3 |
| | 0.5 | 4.5 | 11.6 | 25 |
| Zinc dibutyl | 0.1 | 8.1 | 19.8 | 1 |
| | 0.5 | 4.5 | 14.5 | 53 |

*Example XX*

The stabilizers of Example XIX were incorporated into separate portions of unstabilized polypropylene resin in concentrations of 0.1 and 0.5 phr. The polypropylene used was "Avisun" unstabilized high molecular weight polypropylene resin (specific gravity 0.905–0.910; melt index 3.5 grams/10 minutes at 230° C. under 2160 grams load; and power factor 0.0007 at 73° F. and 60 cycles). The stabilizers and 0.25 phr. of zinc stearate were fluxed with the resin on a 330° F. mill for 4 minutes. One portion was left unstabilized. The test stocks were taken off the mill in sheets approximately 50 mils in thickness, plied up in 2″ x 2″ x 0.125″ molds, held at 400° F. for 3 minutes without application of pressure, then for 5 minutes at 1,000 pounds per square inch pressure. The molded samples were cooled while still under pressure.

Form stability tests were performed on samples thus formed by measuring the thickness of a molded sample before and after heating it for 60 minutes and 120 minutes on a glass plate in a 400° F. oven. Thickness was measured in four places on each sample with a micrometer. Form stability or percent flow is calculated from the ratio of thickness after heating to original thickness; form stability is inversely proportional to percent flow, that is, the less well stabilized the resin, the higher its percent flow.

Molded samples of each formulation were also heat aged in test tubes heated in an aluminum block at 300° F. according to ASTM test D865–57. Samples were tested for brittleness once each day by bending between thumb and forefinger.

Both the form stability test and the qualitative aluminum block heat aging test show that at concentrations of 0.5% based on the resin, the zinc dialkylthiocarbamoyl hemisulfinates tested are very effective in preventing oxidative degradation of polypropylene.

*Example XXI*

Tests were made comparing zinc dimethyl, zinc dibutyl and cadmium diethyl hemisulfinates in Avisun polypropylene resin with an untreated control resin on the Brabender plastograph in the presence of heat and air measuring the decrease in torque of resin being worked and degraded. The hemisulfinates were used in concentrations of 0.1 and 0.5 phr. The stabilizers and 0.25 phr. of zinc stearate were fluxed with the resin on a mill for 4 minutes at 330° F. One portion was left unstabilized.

The Brabender plastograph measures and records the plasticity of viscous material placed in a jacketed mixing chamber. In this test, a sigma blade was driven by a freely swinging dynamometer mounted in ball bearings. The resistance which the material under test exerts toward mixing is transferred to the dynamometer, whose housing tends to equalize this resistance by turning in the direction opposite that of the drive shaft. The resultant thrust is transmitted through a lever system to a scale and an electric recorder which is calibrated to give, in meter-grams of torque, the resistance to mechanical agitation offered by the material under test at the temperature used. In these tests, a 40-gram batch of polypropylene containing the hemisulfinates was mixed at 63 r.p.m. at 475° F. and readings were taken at intervals over a period of 15 minutes. The results of these tests are summarized in Table 15.

Form stability tests of the type described in Example XX were also made on the resin compositions, and the results are included in Table 15.

TABLE 15.—HEMISULFINATES IN POLYPROPYLENE

| Hemisulfinate | Concn., phr. | Form Stability [1] | | Brabender Plastograph Readings [2] | | | |
|---|---|---|---|---|---|---|---|
| | | 60 min., percent flow | 120 min., percent flow | 2 min. | 6 min. | 10 min. | 15 min. |
| None | | 31 | 44 | 290 | 50 | 30 | 20 |
| Zinc dimethyl | 0.1 | 70 | 15 | 360 | 157 | 60 | 29 |
| | 0.5 | 3.7 | 14 | 450 | 315 | 215 | 150 |
| Zinc dibutyl | 0.1 | 6.4 | 20 | 418 | 165 | 65 | 45 |
| | 0.5 | 5.3 | 18 | 400 | 245 | 175 | 120 |
| Cadmium diethyl | 0.1 | 5.3 | 13 | 385 | 157 | 59 | 28 |
| | 0.5 | 3.5 | 8 | 370 | 233 | 147 | 92 |

[1] At 400° F.
[2] Brabender plastograph operated at 63 r.p.m. at 475° F.

These data show that all three sulfinates exert an antioxidant effect at the 0.5 phr. concentration as indicated by high Brabender torque readings and low percent flow when oven-aged at 400° F.

*Example XXII*

Zinc dimethyl-, diethyl-, and dibutyl hemisulfinates were incorporated into an ethylene-propylene copolymer, and tested as stabilizers by a modification of the Brabender technique. Eastman Tenite polyallomer 5C21A, a resin in which the polymer chains are composed of polyethylene segments attached to polypropylene segments rather than being composed of alternate ethylene and propylene units or some regular sequence of the same, was mixed in separate 40-gram batches with 0.1 and 0.5 phr. of the stabilizers, put into a roller head mixer Brabender apparatus, and premixed for 10 minutes at 406° F. under an atmosphere of nitrogen. The nitrogen was then removed and mixing was continued in the presence of air for another 25 minutes. Readings of torque were taken at the beginning of the air mixing and at the end. The difference in readings is an inverse measure of the stability of the resin: the greater the difference, the less stable the resin. Percent Brabender stability was determined for each resin from the ratio of the area under the curve of the automatically recorded graph to the total possible area. These data are tabulated below.

TABLE 16.—HEMISULFINATES IN ETHYLENE-PROPYLENE POLYALLOMER

| Hemisulfinate | Concentration, phr. | Plastograph Readings | | | Brabender Stability, Percent |
|---|---|---|---|---|---|
| | | Initial, m.-gr. | Final, m.-gr. | Difference, m.-gr. | |
| None (control) | | 963 | 688 | 275 | 75.3 |
| Zinc dimethyl | 0.1 | 980 | 865 | 115 | 86.9 |
| | 0.5 | 963 | 880 | 83 | 89.5 |
| Zinc diethyl | 0.1 | 980 | 840 | 140 | 82.2 |
| | 0.5 | 980 | 900 | 80 | 90.5 |
| Zinc dibutyl | 0.1 | 983 | 942 | 41 | 81.1 |
| | 0.5 | 980 | 912 | 68 | 92.3 |

These data show that the sulfinates have an antioxidant or stabilizing effect in the ethylene-propylene polyallomer. The stabilizing effect of these additives is considered very good in view of the fact that the resin already contained a stabilizing system, and that exerted by the sulfinates is in addition to that exerted by the stabilizers already present in the control resin containing no sulfinate.

*Example XXIII*

The zinc dialkylthiocarbamoyl hemisulfinates were compared in antioxidant effect in a peroxide-cross-linked polyethylene. These materials were added to separate portions of the compound:

| | Parts by weight |
|---|---|
| Low density polyethylene DYNH | 100 |
| MT carbon black | 50 |
| Varox[1] cross-linking agent | 4 |
| Antioxidant | 0.5 |

[1] Varox=2,5-bis(t-butylperoxy) - 2,5 - dimethylhexane product of R. T. Vanderbilt Company, Inc.

One portion of the stock was left untreated as a control. After fluxing for 10 minutes in a 250–270° F. Banbury mixer each formulation was press cured for 40 minutes at 340° F. Tensile strengths were determined before and after aging for 7 days in test tubes at 300° F. Compression was also determined by a modified Williams technique in which a 0.5-inch square sample was placed under a 10-kilogram weight for 0.5 hour at 250° F. and the ratio of compressed height to original height determined. These data are summarized in the table below.

TABLE 17.—HEMISULFINATES IN CROSS-LINKED POLYETHYLENE

| | Untreated | | | | Zinc Dialkylthiocarbamoyl Hemisulfinates | | | | | | | | | | | |
|---|---|---|---|---|---|---|---|---|---|---|---|---|---|---|---|---|
| | | | | | Dimethyl, 0.5 phr. | | | | Diethyl, 0.5 phr. | | | | Dibutyl, 0.5 phr. | | | |
| Modified Williams Test at 250° F., Percent Compression | 1.5 | | | | 5.9 | | | | 7.3 | | | | 6.2 | | | |
| | S | T | E | H | S | T | E | H | S | T | E | H | S | T | E | H |
| Physicals After Press Cure for 40 minutes at 340° F. | 1,000 | 2,090 | 270 | 55 | 1,300 | 1,880 | 350 | 54 | 1,210 | 2,030 | 350 | 54 | 1,140 | 2,040 | 350 | 54 |
| Cured, Then Aged 7 days at 300° F. in Test Tubes: Physicals | 900 | 1,200 | 30 | 50 | 900 | 1,910 | 330 | 53 | 1,310 | 2,110 | 290 | 54 | 810 | 1,900 | 250 | 53 |

It is seen that the hemisulfinates are effective as antioxidants in cross-linked polyethylene. The action of zinc diethyl hemisulfinate is particularly good. The Williams plasticity values show that the hemisulfinates do not retard the cure unduly.

For stabilizing polyolefins, the hemisulfinates are generally useful in amounts greater than 0.2 part per hundred of the polymer.

*Example XXIV*

Zinc diamyl- and zinc dibutylthiocarbamoyl hemisulfinates were tested as oxidation inhibitors in a high viscosity index (45 SSU at 210° F.), solvent refined petroleum lubricating oil. The sulfinates were added in 0.5-gram quantities to separate 100-gram portions of the oil which were placed in 400-ml. beakers in a 250° F. oven. One portion of oil containing no additive served as an untreated control. Aliquots of oil were withdrawn before exposure of the oils in the oven, and after 336 hours and 672 hours for determination of neutralization number, viscosity increase, sludge formation and color. The results of these tests are presented in the table below.

TABLE 18.—OVEN STABILITY IN LUBRICATING OIL

| Additive | None | Zinc Hemisulfinates at 0.5% by Weight | |
|---|---|---|---|
| | | Dibutyl | Diamyl |
| Neutralization number, in mg. KOH/gram oil: | | | |
| Original | <0.01 | | |
| After 200 hours | 0.76 | 0.15 | 0.19 |
| After 336 hours | | 0.20 | 0.50 |
| After 672 hours | | 0.23 | 0.28 |
| Viscosity increase, percent: | | | |
| After 336 hours | 8.7 | 0.7 | 0.0 |
| After 672 hours | 10.5 | 1.2 | 0.0 |
| Sludge, percent | >0.5 | 0.04 | 1.2 / 0.08 |

These tests show that the zinc dibutyl- and zinc diamylthiocarbamoyl hemisulfinates have very useful antioxidant properties in the oven stability test because they maintain the viscosity level of the base oil and prevent the formation of acid.

*Example XXV*

Samples of oil containing zinc diamyldithiocarbamate diamylthiocarbamoyl sulfinate were subjected to the Indiana oxidation test. This test, described in Industrial and Engineering Chemistry, Analytical Education 6, 419–20 (1934), was modified by using 100-ml. portions of a naphthenic base oil having a Saybolt viscosity of 40 at 210° F., and heating the sample for 100 hours at 250° F. in the presence of four inches each of copper and steel wire, and aerating at the rate of 2.67 liters per hour. At the conclusion of the oxidation, the viscosity of the oil was measured and the percent increase recorded. Neutralization number, the number of milligrams of KOH required to neutralize one gram of oil, was determined and recorded. The wire was examined for changes in appearance. The results are presented in the table below:

TABLE 19.—INDIANA OXIDATION TEST OF HEMISULFINATES IN LUBRICATING OIL

| Hemisulfinate | Concentration, percent | Viscosity Increase, percent | Neutralization No. | Appearance After Test | | |
|---|---|---|---|---|---|---|
| | | | | Steel | Copper | Sludge |
| Untreated Control | | 17.0 | 0.67 | Gray | Heavily tarnished. | Moderate to heavy. |
| Zinc diamyl | 0.5 | 11.4 | 0.10 | Bright | Slightly tarnished. | None. |

Thus it is shown that zinc diamylthiocarbamoyl hemisulfinate is a very effective, non-corrosive antioxidant in mineral lubricating oil.

*Example XXVI*

To test the dialkyl hemisulfinates as agricultural fungicides, spraying solutions containing 2 pounds of a 65% active solution per 100 gallons of spray were prepared and applied in a regular schedule to potato plants growing in southern Florida. The rate of application was approximately 200 gallons per acre. An initial measurement of the percentage of defoliation on the test compounds and on the untreated controls was taken early in the growing season. Another measurement was made 17 days after the first measurement. All measurements of defoliation are presented in the following table:

TABLE 20.—HEMISULFINATES IN FUNGICIDES

| | Initial Measurement | Measurement 17 days later |
|---|---|---|
| Zinc dimethyl hemisulfinate | 4.0 | 27.5 |
| Manganese dimethyl hemisulfinate | 4.0 | 20.0 |
| Copper dimethyl hemisulfinate | 4.0 | 30.0 |
| Ferric bis(dimethyl dithiocarbamoyl) dimethylthiocarbamoyl sulfinate | 4.0 | 30.0 |
| Untreated | 10.0 | 40.0 |

The data show that the metal dialkyl hemisulfinates are effective in the control of early and late blight of potato plants.

We claim:

1. Compounds having the general structural formula

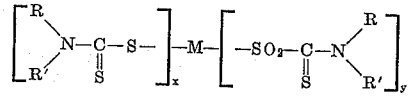

wherein M is a metal selected from the group consisting of the divalent metals copper, zinc, manganese, nickel, lead, cadmium, cobalt, tin(II), barium, and mercury, the trivalent metals iron(III) and bismuth and the tetravalent metal tin(IV), $x$ and $y$ are 1 to 2, their sum being the valence of M, and the moiety

is the residue of a secondary amine which will react with carbon disulfide to form a dithiocarbamate, R and R' are groups of the class consisting of saturated hydrocarbon groups and saturated hydrocarbon groups joined through a radical of the class consisting of —CH$_2$—, oxygen and sulfur to form with the amine nitrogen a heterocyclic ring, each of said groups R and R' containing 1 to 12 carbon atoms, the total number of carbon atoms in R and R' being not greater than 24.

2. The compound described in claim 1 in which M is zinc.

3. The compound described in claim 1 in which R and R' are alkyl groups containing 1 to 12 carbon atoms and M is tin of the class consisting of Sn(II) and Sn(IV).

4. The compound described in claim 1 in which M is ferric iron.

5. The compound described in claim 1 in which M is bismuth.

6. The process for the preparation of the compounds described in claim 1 which comprises reacting in a solution in an inert solvent, said solution having a pH above 7.0, a compound having the structural formula

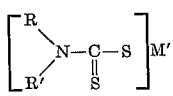

wherein M' is an alkali metal, with hydrogen peroxide to form a dithiopercarbamate having the structural formula

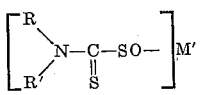

and reacting said dithiopercarbamate in solution in an inert solvent with a soluble salt of M, the symbols M, R, R', $x$ and $y$ having the meanings stated in claim 1.

7. The process described in claim 6 in which the solvent is water.

8. The process described in claim 7 in which the valence of the metal M is an even number in the range 2–4 and in which the moles of hydrogen peroxide used are approximately equal to the moles of alkali metal dithiocarbamate.

9. The process described in claim 7 in which the metal M is trivalent and about ⅔ mole of hydrogen peroxide is used per mole of alkali metal dithiocarbamate thereby to form a compound in which $x$ is 2 and $y$ is 1.

10. The process described in claim 7 in which the metal M is trivalent and about 1⅓ moles of hydrogen peroxide are used per mole of alkali metal dithiocarbamate thereby to form a compound in which $x$ is 1 and $y$ is 2.

11. The process described in claim 7 in which the reaction with hydrogen peroxide is cooled to maintain a temperature below 50° C.

12. The process described in claim 7 in which said temperature is maintained in the range 5–25° C.

13. Zinc dimethyldithiocarbamate dimethylthiocarbamoylsulfinate.

14. Zinc diethyldithiocarbamate diethylthiocarbamoylsulfinate.

15. Zinc dibutyldithiocarbamate dibutylthiocarbamoylsulfinate.

16. Cadmium dialkyldithiocarbamate dialkylthiocarbamoylsulfinate in which the alkyl group contains from 1 to 12 carbon atoms.

17. Manganese dialkyldithiocarbamate dialkylthiocarbamoylsulfinate in which the alkyl group contains from 1 to 12 carbon atoms.

18. Mercuric dialkyldithiocarbamate dialkylthiocarbamoylsulfinate in which the alkyl group contains from 1 to 12 carbon atoms.

19. Barium dialkyldithiocarbamate dialkylthiocarbamoylsulfinate in which the alkyl group contains from 1 to 12 carbon atoms.

20. Cobaltous dialkyldithiocarbamate dialkylthiocarbamoylsulfinate in which the alkyl group contains from 1 to 12 carbon atoms.

21. Nickel dialkyldithiocarbamate dialkylthiocarbamoylsulfinate in which the alkyl group contains from 1 to 12 carbon atoms.

22. Cupric dialkyldithiocarbamate dialkylthiocarbamoylsulfinate in which the alkyl group contains from 1 to 12 carbon atoms.

23. Lead dialkyldithiocarbamate dialkylthiocarbamoylsulfinate in which the alkyl group contains from 1 to 12 carbon atoms.

References Cited

UNITED STATES PATENTS

| | | | |
|---|---|---|---|
| 2,576,896 | 11/1951 | Albrecht | 252—8.75 |
| 2,727,004 | 12/1955 | Cohen | 252—8.75 |
| 2,812,306 | 11/1957 | Liehe | 252—33.6 |
| 2,911,394 | 11/1959 | Brooks et al. | 260—79.5 |
| 2,927,936 | 3/1960 | Harvey | 260—429 |
| 2,937,147 | 5/1960 | Goldwasser | 252—107 |
| 2,947,695 | 8/1960 | Leshin et al. | 252—33.6 |
| 2,976,305 | 3/1961 | Reese et al. | 260—429 |
| 2,977,316 | 3/1961 | Taylor | 252—107 |
| 2,980,645 | 4/1961 | Newland et al. | 260—45.75 |
| 3,001,969 | 9/1961 | Tholstrup et al. | 260—45.75 |
| 3,069,398 | 12/1962 | Freytag et al. | 260—79.5 |
| 3,085,042 | 4/1963 | Luginbuhl | 167—22 |
| 3,085,043 | 4/1963 | Beaver et al. | 167—22 |

TOBIAS E. LEVOW, *Primary Examiner.*

DANIEL E. WYMAN, *Examiner.*

C. F. DEES, W. F. BELLAMY, *Assistant Examiners.*